United States Patent
Mitran et al.

(10) Patent No.: US 7,908,596 B2
(45) Date of Patent: Mar. 15, 2011

(54) AUTOMATIC INSPECTION OF COMPILED CODE

(75) Inventors: Marcel Mitran, Markham (CA); Alexander Vasilevskiy, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 11/620,157

(22) Filed: Jan. 5, 2007

(65) Prior Publication Data
US 2008/0168426 A1    Jul. 10, 2008

(51) Int. Cl.
*G06F 9/45*    (2006.01)
(52) U.S. Cl. ......... 717/140; 717/145; 717/148; 717/151
(58) Field of Classification Search .................... 717/140
See application file for complete search history.

(56) References Cited

U.S. PATENT DOCUMENTS

| | | | |
|---|---|---|---|
| 5,848,274 A * | 12/1998 | Hamby et al. ................ | 717/153 |
| 6,078,744 A * | 6/2000 | Wolczko et al. .............. | 717/153 |
| 6,415,436 B1 * | 7/2002 | Patel ............................ | 717/140 |
| 6,519,767 B1 * | 2/2003 | Carter et al. .................. | 717/140 |
| 6,658,421 B1 * | 12/2003 | Seshadri ....................... | 717/140 |
| 6,983,457 B2 * | 1/2006 | Mitsumori et al. ........... | 717/145 |
| 7,809,547 B2 * | 10/2010 | Guenthner et al. ........... | 717/140 |
| 2003/0093649 A1 | 5/2003 | Hilton ............................ | 712/41 |
| 2004/0205736 A1 * | 10/2004 | Mitsumori et al. ........... | 717/142 |
| 2004/0221273 A1 * | 11/2004 | Sandham et al. ............. | 717/134 |
| 2006/0101433 A1 * | 5/2006 | Opem et al. .................. | 717/140 |

OTHER PUBLICATIONS

Fanberg, V. "Use of binary file comparison tools in software release management" Quality Software, 2001. Proceedings. Secode Asia-Pacific Conference on, 2001, pp. 436-444.*

* cited by examiner

*Primary Examiner* — Thomas K Pham
(74) *Attorney, Agent, or Firm* — John Campbell; Blanche E. Schiller, Esq.; Heslin Rothenberg Farley & Mesiti P.C.

(57) ABSTRACT

Automatic inspection of compiled code. In response to revising a compiler, the functionality of that compiler is verified. Specific code is compiled using a first version of the compiler, as well as a second version of the compiler. Each compiled code is then applied to machine state to obtain multiple machine states. The machine states are then compared to determine if they are equal.

20 Claims, 4 Drawing Sheets

US 7,908,596 B2

AUTOMATIC INSPECTION OF COMPILED CODE

TECHNICAL FIELD

This invention relates, in general, to the testing of revised compilers of a processing environment, and in particular, to inspecting and verifying compiled code of the processing environment.

BACKGROUND OF THE INVENTION

Compilers are programs that translate source code into object code. A compiler looks at the source code and collects and reorganizes the instructions in order to translate the source code into object code.

A compiler is included with a high level programming language. Examples of high level programming languages include C, C++, Fortran, Pascal, etc. The compiler may be written in the same language as the high level programming language or a different language.

Developers of compilers often revise the compilers to enhance their functionality and/or to correct errors that may arise. However, when changes are made to the compiler, it is often difficult to verify that such improvements have not regressed functionality of previously working programs, especially in those instance where the developers do not have access to the runtime environment of the programming language.

In an attempt to check the revised compiler, a set of tests (e.g., un-executable code snippets) are used to determine whether the revised compiler is functioning properly. The compiled code is inspected and the test cases are looked at with reference to the compiled code, but the test cases are not executed. Instead, verification involves manual inspection of the generated code to guarantee that functionality pre- and post-compiler improvement is identical. When the set of tests becomes large, such inspection can be very laborious, tedious and counterproductive.

SUMMARY OF THE INVENTION

Based on the foregoing, a need exists for a capability that enables efficient verification of compiled code generated by a revised compiler. For example, a need exists for an automatic verification capability that enables results generated by a revised compiler to be automatically verified.

The shortcomings of the prior art are overcome and additional advantages are provided through the provision of an article of manufacture that includes at least one computer usable medium having computer readable program code logic to verify compiled code of a processing environment. The computer readable program code logic when executing performing, for instance, the following: compiling code using one version of a compiler to provide one compiled code, wherein the code is written in a programming language in which a complete run-time environment for that programming language is unavailable for verifying the compiled code; compiling the code using another version of the compiler to provide another compiled code; applying the one compiled code to machine state to obtain one result and the another compiled code to the machine state to obtain another result; and automatically comparing the one result and the another result to determine whether the another version of the compiler is accurate.

Method and systems corresponding to the above-summarized computer program product are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect, of the present invention, a capability is provided for automatically inspecting compiled code to determine the accuracy of a revised compiler. As one example, the capability includes capturing program state transitions and using those transitions as a comparative point for verification.

Figure 1:
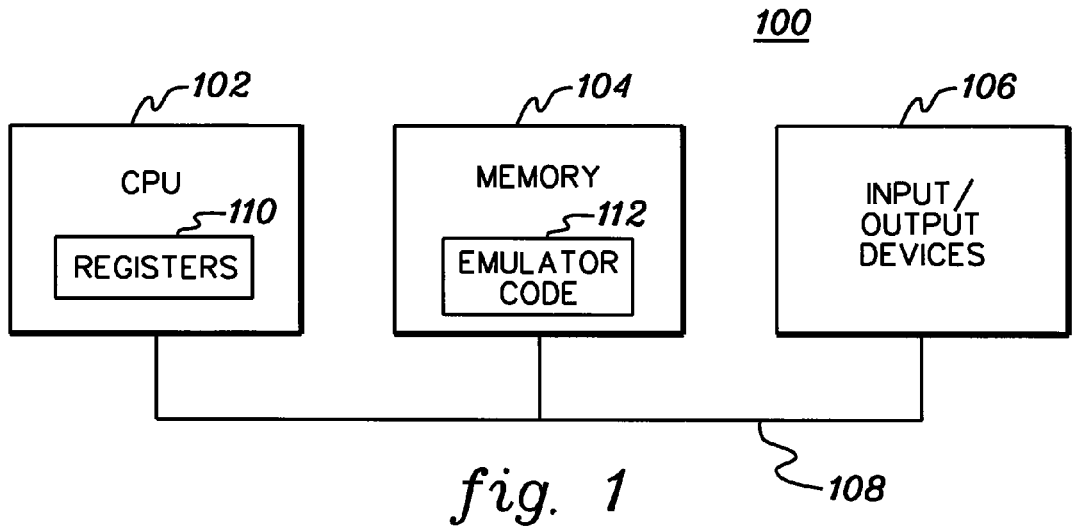
FIG. 1 depicts one embodiment of a processing environment to incorporate and use one or more aspects of the present invention.

One embodiment of a processing environment to incorporate and use one or more aspects of the present invention is described with reference to FIG. 1. Processing environment 100 includes, for instance, a central processing unit 102, a memory 104 (e.g., main memory) and one or more input/output (I/O) devices 106 coupled to one another via, for example, one or more buses 108. As examples, processing environment 100 includes a pSeries® or xSeries® server offered by International Business Machines Corporation (IBM®), Armonk, N.Y. IBM®, pSeries® and xSeries® are registered trademarks of International Business Machines Corporation, Armonk, N.Y., U.S.A. Other names used herein may be registered trademarks, trademarks or product names of International Business Machines Corporation or other companies.

Central processing unit 102 includes one or more registers 110, such as one or more general purpose registers and/or one or more special purpose registers, used during processing within the environment. These registers include information that represent the state of the environment at any particular point in time.

Moreover, central processing unit 102 executes instructions and code that are stored in memory 104. In one particular example, the central processing unit executes emulator code 112 stored in memory 104. This code enables the processing environment configured in one architecture to emulate another architecture. For instance, emulator code 112 allows a pSeries® or xSeries® server to emulate the z/Architecture, offered by International Business Machines Corporation.

Figure 2:
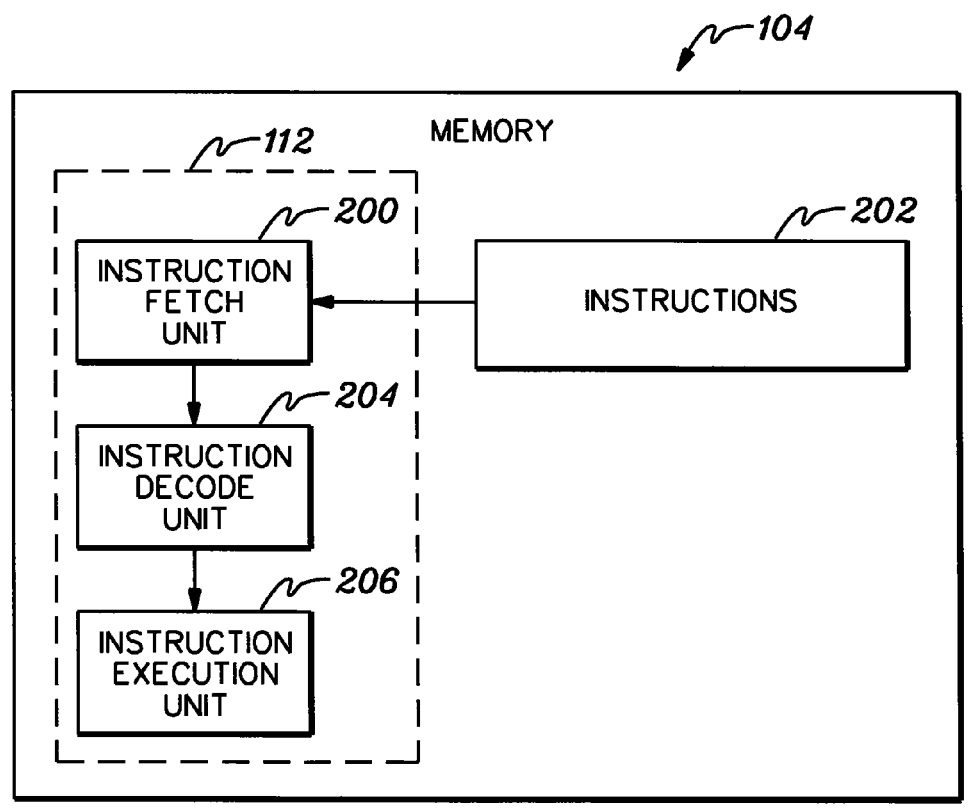
FIG. 2 depicts further details of the memory of FIG. 1, in accordance with one or more aspects of the present invention.

Further details relating to emulator code 112 are described with reference to FIG. 2. In one example, emulator code 112 includes an instruction fetch unit 200 to fetch an instruction 202 from memory 104 and to optionally, provide local buffering for the fetched instruction; an instruction decode unit 204 to receive the instruction from the instruction fetch unit and to determine the type of instruction that has been fetched; and an instruction execution unit 206 to execute the instruction execution may include loading data into a register from memory 104; storing data back to memory from a register; or performing some type of arithmetic or logical operation, as determined by the decode unit. In one example, each unit is implemented in software, which is stored in memory and executed by the central processing unit. In other examples, one or more of the units or operations are implemented in firmware, hardware, software or some combination thereof.

Processing environment 100 is used, for instance, to test revised compilers. The processing environment, however, lacks a complete run-time environment. For instance, a complete run-time environment for the code being compiled and used in testing the revised compilers is unavailable. In particular, in one aspect of the present invention, a capability is provided for automatically inspecting compiled code to determine whether a revised compiler is functioning properly. One embodiment of the logic associated with this capability is described with reference to FIG. 3. This logic can be implemented within software, hardware, firmware and/or a combination thereof within processing environment 100.

Figure 3:
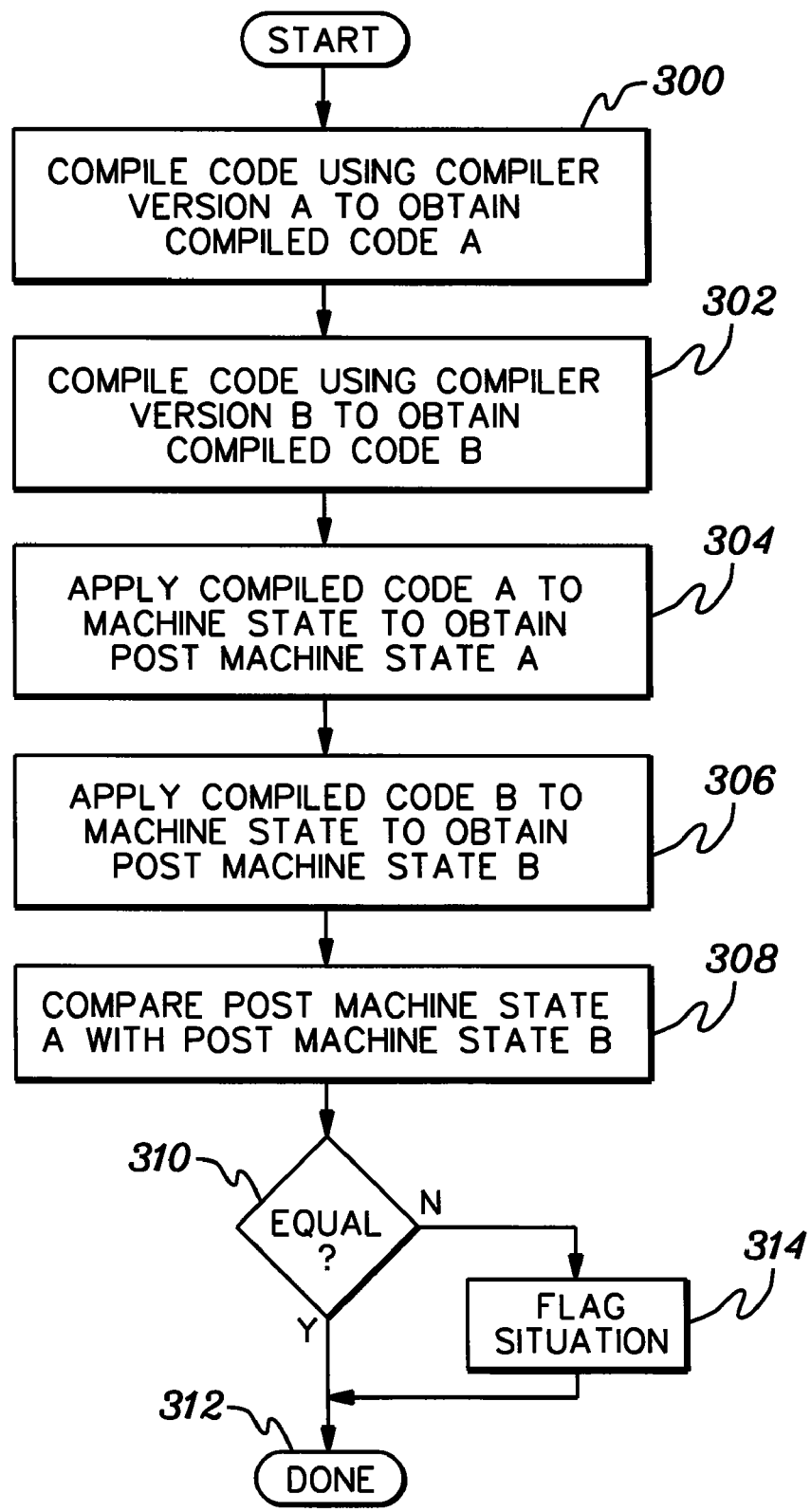
FIG. 3 depicts one embodiment of the logic associated with automatic inspection of compiled code, in accordance with an aspect of the present invention.

Referring to FIG. 3, consider a program written in a high level language, high_level_language_program, and two instances of a compiler, compiler_version A and compiler_version B. The high level language can be any high level language, such as C, C++, Pascal and Fortran, as examples. Further, the compilers can also be written in any high level programming language, such as C, C++, Pascal, Fortran, etc.

In accordance with an aspect of the present invention, code written in the high level language is compiled using compiler_version A to obtain compiled code A, STEP 300. Likewise, a copy of the same code is also compiled using compiler_version B to yield compiled code B, STEP 302.

Although compiler_version B is a revised version of compiler_version A, code compiled using compiler_version B is expected to produce results that are identical or substantially identical to the same code compiled using compiler_version A. It is expected that machine state transformation, when applying the two compiled code representations to the state of the machine, will produce sufficiently equal state transitions. Therefore, subsequent to compiling the code, compiled code A is applied to the machine state to obtain post machine state A, STEP 304. This is further described with reference to FIG. 4.

Figure 4:
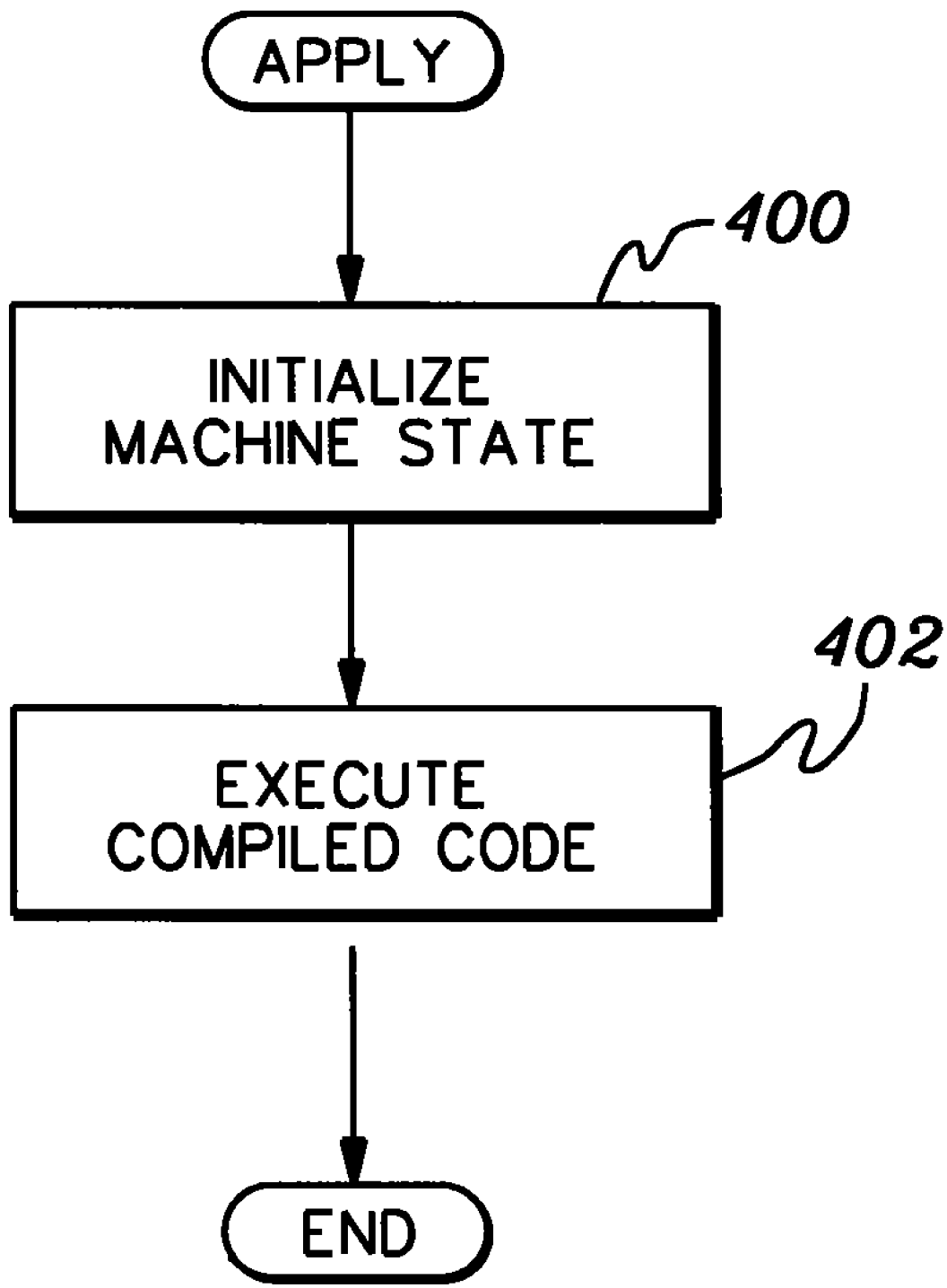
FIG. 4 depicts further details of the apply step of FIG. 3, in accordance with an aspect of the present invention.

Referring to FIG. 4, initially, in one embodiment, the machine state is initialized to pre-defined values, STEP 400. As examples, the machine state includes values of general purpose registers; values of special purpose registers, like program status word (PSW) and condition code (CC), etc.; and values in memory. Thus, to initialize the machine state, predefined values are loaded in the general and/or special purpose registers (or a subset thereof). Further, memory is set up in a defined manner. In one embodiment, it is the emulator code that tracks the memory to be affected. In particular, in an emulated environment, as the code executes, the changes in state can be tracked. This allows a compressed representation of state that is to be initialized and checked.

Subsequent to initializing the machine state, compiled code A is executed in order to manipulate the machine state, STEP 402. That is, the executed code manipulates the registers and memory to produce a new machine state, referred to herein as post machine state A.

Returning to FIG. 3, in addition to the above, compiled code B is applied to the same initial machine state to obtain post machine state B, STEP 306. This is accomplished by performing the steps of FIG. 4.

Thereafter, post machine state A is compared with post machine state B to determine if they are the same or substantially the same, depending on the test characteristics, STEP 308. In one example, it is the responsibility of the tester to define which, if any, descriptors of the state have tolerances and what the tolerances are. This comparison includes comparing the value in each register of post machine state A with the value of its corresponding register in post machine state B. Further, it includes comparing the memory of post machine state A with the memory of post machine state B. If post machine state A is substantially equal to post machine state B, INQUIRY 310, then processing is complete and the revision of compiler B is considered successful, STEP 312. Otherwise, the situation is flagged, STEP 314, indicating that the revised compiler is a failure or that further inspection of the code or the compiler is desired.

The above logic can be repeated one or more times to ensure the accuracy of compiler B. For instance, STEPS 304-308 can be repeated one or more times for different initializations of prior machine state.

Described in detail above is a capability for automatically determining whether a revised compiler is functioning properly. In one example, the transformations of machine state are tracked by the emulator code. This facilitates access to the machine states that are to be inspected without requiring the saving and accessing of all machine state. That is, the emulated environment provides a compact representation of the machine state. It tracks which registers and memory locations are affected by the execution of the code. However, although in the embodiment described herein, the processing environment executes emulator code, one or more aspects of the present invention can be used in other embodiments that do not execute emulator code.

One or more aspects of the present invention can be included in an article of manufacture (e.g., one or more computer program products) having, for instance, computer useable media. The media has therein, for instance, computer readable program code means or logic (e.g., instructions, code, commands, etc.) to provide and facilitate the capabilities of the present invention. The article of manufacture can be included as a part of a computer system or sold separately.

Figure 5:
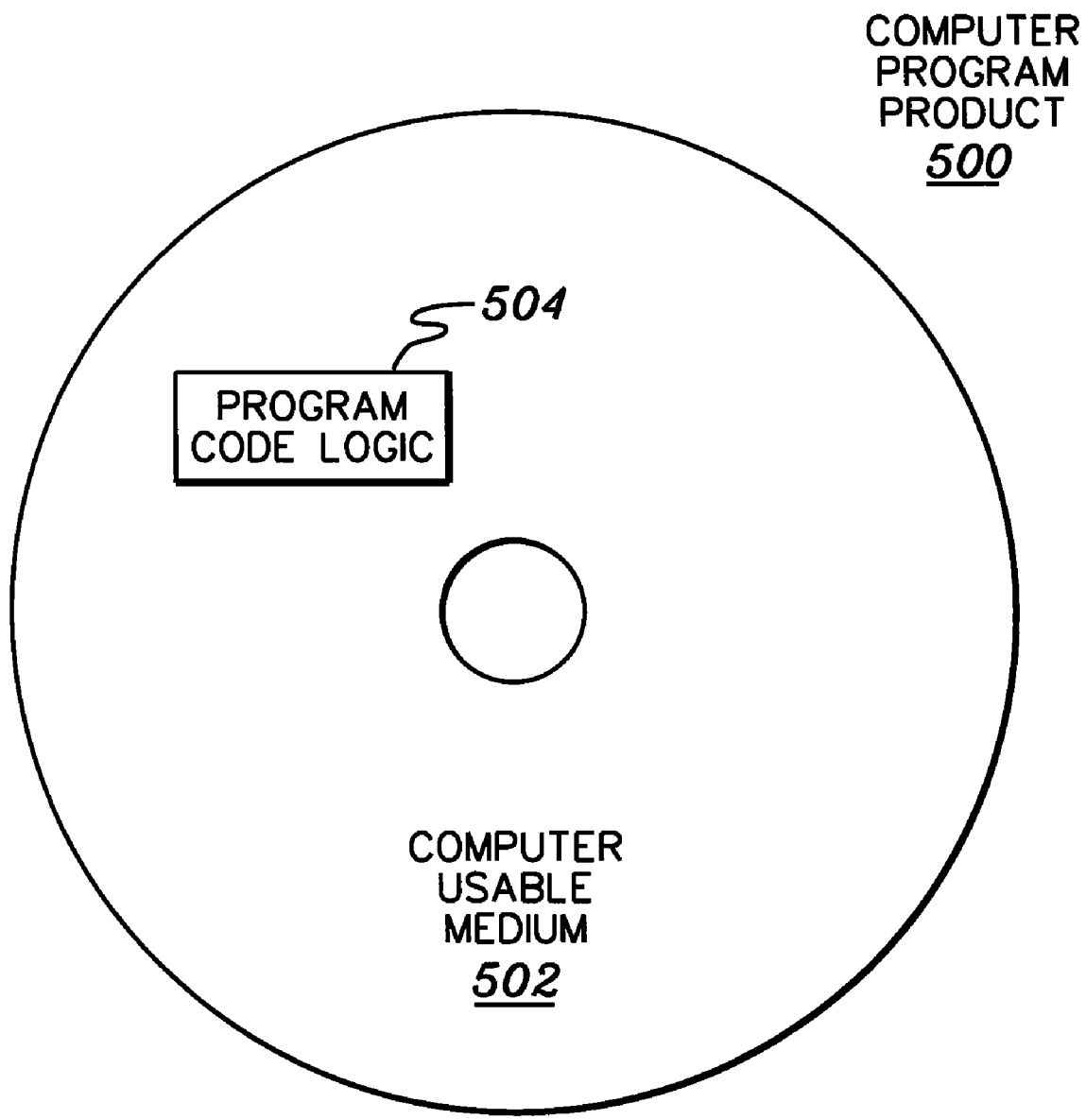
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability for automatically determining whether a revised compiler is working effectively is provided. This eliminates manual inspection of the generated code, unless a sufficient discrepancy in state is found, and guarantees that the functionality of the compiler pre- and post-compiler improvement is substantially identical. This is particularly useful, since compiler developers typically do not have the fully executable program or its relevant data space. Typically, the developers have only partial access to the executable program or its data space, and therefore, cannot run the sequences of code to test. One or more aspects of the present invention eliminate this problem, and therefore, facilitate the improvements of compilers and the testing and verification of such compilers.

One or more aspects of the present invention are particularly useful for programming languages that do not have a runtime environment that are provided therewith.

Although various embodiments are described above, these are only examples. For instance, the processing environment can include processing units that are based on architectures other than the pSeries® or xSeries® architectures. Further, the processing environment can emulate environments other than the z/Architecture. Yet further, the processing environment need not include emulator code. As yet further examples, the states being inspected can be states other than those that have been described herein. Moreover, although the word "compiler" is used herein, "compiler" is defined herein to include compilers, as well as assemblers or any other similar programs.

Yet further, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to, perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An article of manufacture comprising:
at least one computer usable medium having computer readable program code logic to verify compiled code of a processing environment, said computer readable program code logic when executing performing the following:
compiling code using one version of a compiler to provide one compiled code, wherein the code is written in a programming language in which a complete run-time environment for that programming language is unavailable for verifying the compiled code;
compiling the code using another version of the compiler to provide another compiled code;
applying the one compiled code to machine state to obtain one result and the another compiled code to the machine state to obtain another result; and
automatically comparing the one result and the another result to determine whether the another version of the compiler is accurate.

2. The article of manufacture of claim 1, wherein the comparing specifying a difference indicates an error with the another version of the compiler.

3. The article of manufacture of claim 1, wherein the applying the one compiled code comprises executing the one compiled code to manipulate the machine state to obtain the one result, the one result comprising an updated machine state.

4. The article of manufacture of claim 3, wherein the applying the another compiled code comprises executing the another compiled code to manipulate the machine state to obtain the another result, the another result comprising an another updated machine state.

5. The article of manufacture of claim 4, wherein the applying comprises initializing the machine state prior to executing the one compiled code and the another compiled code.

6. The article of manufacture of claim 1, wherein the machine state comprises at least one of one or more values of one or more general purpose registers of the processing environment; one or more values of one or more special purpose registers of the processing environment; and one or more values in memory of the processing environment.

7. The article of manufacture of claim 1, wherein the processing environment comprises an emulated environment.

8. The article of manufacture of claim 7, wherein the emulated environment provides a compact representation of the machine state.

9. A method of verifying compiled code of a processing environment, said method comprising:
compiling code using one version of a compiler to provide one compiled code, wherein the code is written in a programming language in which a complete run-time environment for that programming language is unavailable for verifying the compiled code;
compiling the code using another version of the compiler to provide another compiled code;
applying the one compiled code to machine state to obtain one result and the another compiled code to the machine state to obtain another result; and
automatically comparing the one result and the another result to determine whether the another version of the compiler is accurate.

10. The method of claim 9, wherein the comparing specifying a difference indicates an error with the another version of the compiler.

11. The method of claim 9, wherein the applying the one compiled code comprises executing the one compiled code to manipulate the machine state to obtain the one result, the one result comprising an updated machine state.

12. The method of claim 11, wherein the applying the another compiled code comprises executing the another compiled code to manipulate the machine state to obtain the another result, the another result comprising an another updated machine state.

13. The method of claim 12, wherein the applying comprises initializing the machine state prior to executing the one compiled code and the another compiled code.

14. The method of claim 9, wherein the machine state comprises at least one of one or more values of one or more general purpose registers of the processing environment; one or more values of one or more special purpose registers of the processing environment; and one or more values in memory of the processing environment.

15. The method of claim 9, wherein the processing environment comprises an emulated environment.

16. The method of claim 15, wherein the emulated environment provides a compact representation of the machine state.

17. A system of verifying compiled code of a processing environment, said system comprising:

one version of a compiler to compile code to provide one compiled code, wherein the code is written in a programming language in which a complete run-time environment for that programming language is unavailable for verifying the compiled code;

another version of the compiler to compile the code to provide another compiled code;

a processing unit to apply the one compiled code to machine state to obtain one result and to apply the another compiled code to the machine state to obtain another result; and the processing unit to automatically compare the one result and the another result to determine whether the another version of the compiler is accurate.

18. The system of claim 17, wherein the processing unit to apply executes the one compiled code to manipulate the machine state to obtain the one result, the one result comprising an updated machine state, and executes the another compiled code to manipulate the machine state to obtain the another result, the another result comprising an another updated machine state.

19. The system of claim 17, wherein the processing environment comprises an emulated environment.

20. The system of claim 19, wherein the emulated environment provides a compact representation of the machine state.

* * * * *